US009591145B2

(12) United States Patent
Vadakkanmarveettil et al.

(10) Patent No.: US 9,591,145 B2
(45) Date of Patent: Mar. 7, 2017

(54) APPLICATION-SPECIFIC MOBILE DATA ALLOCATION (71) Applicant: Amazon Technologies, Inc., Seattle, WA (US)

(72) Inventors: Jayadev Vadakkanmarveettil, Seattle, WA (US); Ajith Kumar Manhachery, San Diego, CA (US); Anthony Nicolas Haddad, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/701,352

(22) Filed: Apr. 30, 2015

(65) Prior Publication Data
US 2016/0323458 A1    Nov. 3, 2016

(51) Int. Cl.
*H04M 11/00* (2006.01)
*H04M 15/00* (2006.01)
*H04W 4/24* (2009.01)
*H04W 4/00* (2009.01)
*G06Q 30/02* (2012.01)
*G06Q 30/04* (2012.01)

(52) U.S. Cl.
CPC ........ *H04M 15/60* (2013.01); *G06Q 30/0267* (2013.01); *G06Q 30/04* (2013.01); *H04W 4/003* (2013.01); *H04W 4/24* (2013.01)

(58) Field of Classification Search
CPC .................................................. H04M 15/852
USPC .... 455/406, 405, 63.1, 456.4; 370/329, 235; 705/7.34, 44, 14.49; 709/224, 200; 726/25, 23, 3
See application file for complete search history.

(56) References Cited

U.S. PATENT DOCUMENTS

| | | | |
|---|---|---|---|
| 2008/0084860 A1 | 4/2008 | Bloebaum et al. | |
| 2010/0017506 A1* | 1/2010 | Fadell | H04M 15/00 709/224 |
| 2012/0117478 A1 | 5/2012 | Vadde et al. | |
| 2012/0240236 A1* | 9/2012 | Wyatt | G06F 21/564 726/25 |
| 2013/0054378 A1 | 2/2013 | Hao et al. | |
| 2014/0359710 A1 | 12/2014 | Chaput | |

(Continued)

OTHER PUBLICATIONS

The PCT Search Report and Written Opinion mailed Jul. 8, 2016 for PCT application No. PCT/US2016/030002, 10 pages.

*Primary Examiner* — Kiet Doan
(74) *Attorney, Agent, or Firm* — Lee & Hayes, PLLC (57) ABSTRACT Mobile devices may obtain applications from an application market infrastructure. The applications may consume data from a data allocation that has been purchased from a mobile data provider. A user may assign a sub-allocation of the data allocation with a specific application, for use by the application. When the sub-allocation is depleted, the application may alert the user and also give the user an opportunity to purchase additional data. If the user accepts an offer to purchase additional data, the application calls the application market infrastructure to process a purchase transaction for the additional data. The application market infrastructure interacts with the user to complete the transaction and then instructs the mobile data provider to allocation additional data to the mobile device of the user, which is then added to the sub-allocation associated with the application.

20 Claims, 8 Drawing Sheets (56) References Cited

U.S. PATENT DOCUMENTS

2015/0052620 A1* 2/2015 Yi .................... G06F 21/10
  726/28
2015/0213504 A1* 7/2015 Katz .................. G06Q 30/0272
  705/14.64

* cited by examiner

APPLICATION-SPECIFIC MOBILE DATA ALLOCATION

BACKGROUND

Many mobile device users have to closely monitor their application usage to avoid using up limited prepaid data plans, leading to diminished customer experiences, reduced usage of applications, and a reluctance to try out new applications or features that may consume a lot of data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Mobile devices such as smartphones and tablet computers are often configured to access remote network resources using metered data plans. Users of such devices are billed for mobile data in accordance with the amount of data that is transferred to and from their mobile devices. Mobile data usage may be measured in units of bytes, such as megabytes, gigabytes, terabytes, etc.

A user of a mobile device may purchase an amount of mobile data for one or more mobile devices. The purchased amount may be referred to as a mobile data allocation. In some cases, mobile data is purchased on a subscription basis, where the user is allocated a given amount of data per subscription period. If the user consumes the entire data allocation before the end of the subscription period, they may be given the opportunity to purchase an additional allocation of mobile data for use during the remainder of the subscription period.

In other cases, mobile data may be purchased on a pre-paid, non-subscription basis, where the user purchases a data allocation that may be used over time. When the purchased data allocation has been consumed, the user purchases a new allocation.

A mobile device may be associated with a market infrastructure that allows the user of the device to obtain and install various aftermarket and/or third-party mobile applications on the mobile device. A mobile application is a program that is obtained, installed, and executed on the mobile device. Mobile applications may be provided by numerous independent developers for distribution and sale using the market infrastructure. Mobile applications may be available for a wide range of purposes, including such things as news and weather reporting, gaming, finance, photography, health, music and video, shopping, travel, education, and many others. Some mobile applications may be free, while other applications may be for sale.

An application market infrastructure may maintain a billing account for each user. The billing account has information regarding the user such as payment information and which of the available applications the user has obtained or purchased. When purchasing a mobile application, the market infrastructure can automatically charge the user based on the stored payment information, without requiring the user to re-enter a payment method.

Certain mobile applications may allow so-called "in-app" purchases from the market infrastructure. As an example, an application may allow a user to purchase additional content or capabilities, thereby expanding the functionality of the application.

In-app purchases are facilitated by the market infrastructure. Generally, the mobile application is responsible for presenting purchasable items and allowing the user to select one of the items for purchase. If the user indicates that they would like to purchase one of the items, the mobile application calls the market infrastructure, which manages the purchase flow by implementing secure communications with the mobile application, performing payment processing, keeping track of purchases, and providing verification to the mobile application of the in-app purchases. After the market infrastructure completes the purchase transaction, the mobile application is responsible for enabling or obtaining the purchased item.

The market infrastructure may also support in-app purchases of mobile data allocations. A mobile application may be configured to monitor the remaining mobile data available to the mobile device under a current mobile data allocation and to prompt the user to purchase additional mobile data upon depletion of the current mobile data allocation. When a user indicates that they would like to purchase additional mobile data, the mobile application calls the market infrastructure to initiate a purchase transaction. The market infrastructure conducts the purchase transaction using the billing information associated with the account of the user and upon completion of the transaction authorizes a mobile data provider to provide the additional data allocation for use by the mobile device.

In addition to monitoring overall data usage, a mobile device may be configured to monitor data usage by individual applications. Furthermore, a sub-allocation of the aggregate mobile data allocation may be associated with an application, and the application may be prohibited from using data beyond its associated sub-allocation. The mobile device or the application may be configured to detect depletion of the application sub-allocation and to prompt a user to initiate an in-app purchase of additional data to replenish the sub-allocation. In some cases, the sub-allocation of an application may be reserved for exclusive use by the application, so that other applications are prohibited from using data from the sub-allocation.

In some cases, a user of the mobile device may allocate available data based on personal preferences. For example, the user may decide that they want to use only a certain amount of their data for specific applications. In other cases, a parent or other responsible person may specify allocations for certain applications. For example, a parent may configure a child's mobile device to use only a certain allocation of data for a game installed on the mobile device, and to prohibit the game from using data beyond that allocation. In particular, the parent may configure the mobile device so that the game is allocated data only from a pool of free data available to the device, and is prohibited from using additional data that may result in usage charges. As another example, a work-related application installed on a personal mobile device may be configured to use data from an allocation that is provided and paid for by an employer. As yet another example, non-work-related applications installed on an employer-provided mobile device may be restricted to using data from an allocation that is paid for by an employee. Usage allocations and restrictions are specified either by the user of the mobile device or by another person or entity who is associated with the mobile device, such as a parent or employer, and not by the market infrastructure.

Figure 1:
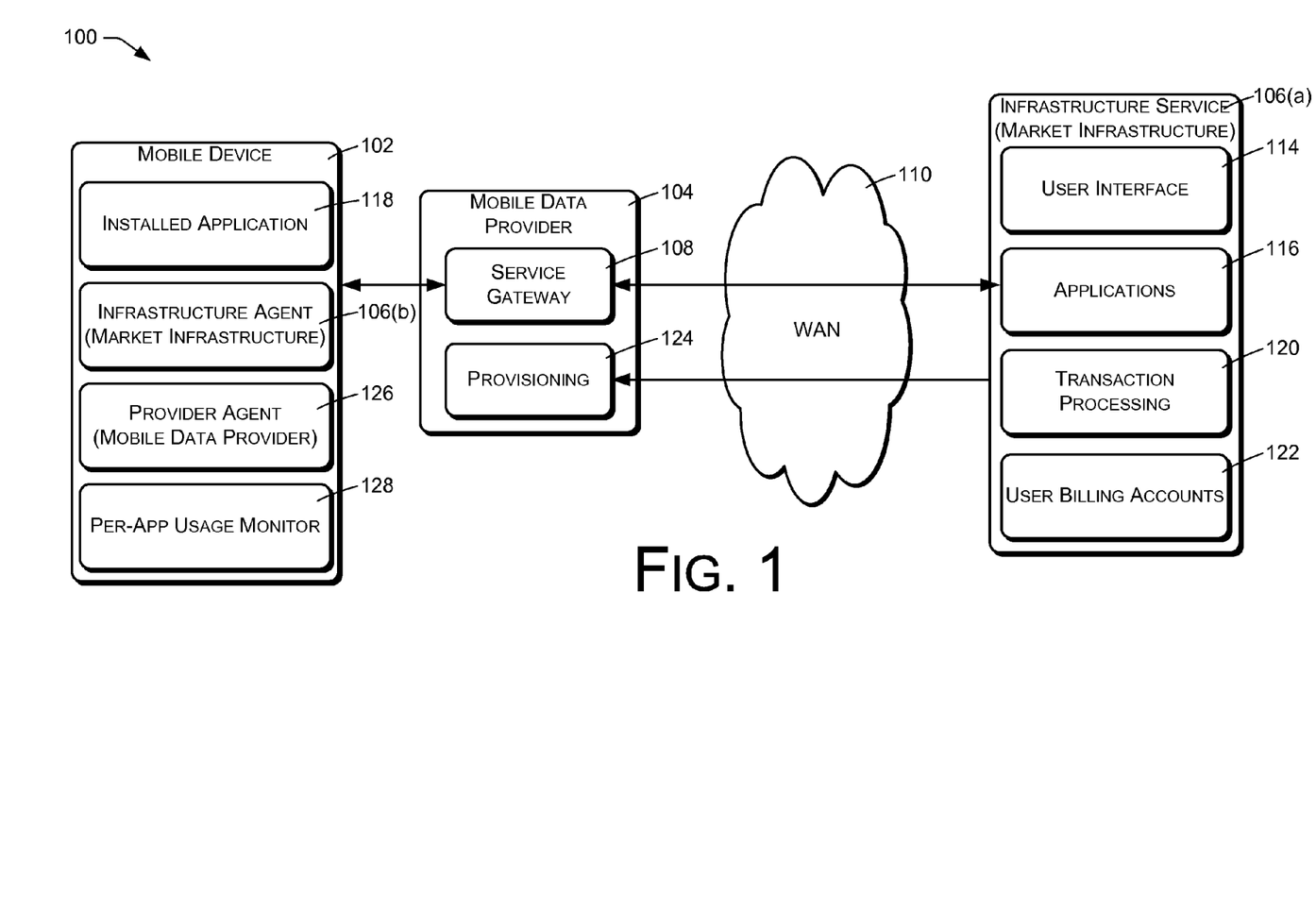
FIG. 1 is a block diagram depicting an illustrative operating environment in which an application marketplace infrastructure supports purchases from within applications of mobile data allocations.

FIG. 1 illustrates an example system 100 in which the described techniques may be implemented. The system 100 includes a mobile device 102, a mobile data provider 104, and a market infrastructure 106 that provides consumer applications for installation on consumer mobile devices. In this embodiment, the market infrastructure 106 includes an infrastructure service 106(a) and an infrastructure agent 106(b). The infrastructure service 106(a) may comprise a service provider network that provides services to multiple mobile devices. The infrastructure agent 106(b) may comprise a software component that runs as a background service on the mobile device 102. In some cases the infrastructure agent 106(b) may comprise an application that is obtained from the infrastructure service 106(a) and installed on the mobile device 102.

The mobile device 102 may comprise a smartphone, a tablet computer, or any other type of device that has capabilities for receiving data from and/or sending data to remote entities based on a metered or allocated data usage plan. In the described embodiments, the mobile device 102 communicates wirelessly using cellular data technologies such as GSM, HSPA, LTE, etc., which are enabled and metered by the mobile data provider 104.

For purposes of illustration, FIG. 1 shows the mobile data provider 104 as having a service gateway 108. The illustrated service gateway 108 represents the communications infrastructure provided by the mobile data provider 104, which connects the mobile device 102 with a wide-area network (WAN) 110 such as the Internet. The mobile device 102 communicates with the infrastructure service 106(a) through the WAN 110.

The market infrastructure 106 may include various components in addition to those shown, including both hardware and software components. Generally, various functions described herein as being performed by the market infrastructure 106 may be performed or supported by either or both of the infrastructure service 106(a) and the infrastructure agent 106(b). In the described embodiment, the market infrastructure 106 receives application purchase requests from multiple devices, where each application purchase request is a request to obtain an application for execution by a device. In response to receiving the application purchase requests, the market infrastructure 106 provides the requested applications to the requesting devices, while in some cases also processing purchase transactions to charge users of the devices for the provided applications.

The market infrastructure 106 implements or supports a user interface 114 through which a user of the mobile device 102 may browse and select from mobile applications 116 that are available from the infrastructure service 106(a). In some cases, the user interface 114 may comprise a website that is available through a web browser. In other cases, the user interface 114 may be at least partially implemented by an application that executes on the mobile device 102. In either case, the user of the device 102 is able to browse the available applications 116, to see descriptions of the applications 116, to download selected ones of the applications 116 from the infrastructure service 106(a), to install the selected applications 116 on the mobile device 102, and to run the selected applications 116 on the mobile device 102. FIG. 1 shows an example of an installed application 118 that has been installed on the mobile device 102 in this manner. Generally, the installed application 118 may be any application that has been obtained by and installed by the customer. In the described embodiment, the application 118 comprises an application that has been downloaded from the infrastructure service 106(a) and installed on the mobile device 102. The illustrated application 118 is an example of multiple such applications that may be installed concurrently on the mobile device 102.

The market infrastructure 106 may support "in-app" purchases, which are purchases by the user of content, features, or capabilities that are offered from within installed applications. As an example, the installed application 118 may comprise a game application having enhanced or additional features that can be purchased. For example, a user may be able to purchase additional "powers" for a character in a game.

For an in-app purchase, the installed application 118 is responsible for presenting a catalog of available purchasable items to the user. The user selects a purchasable item and the installed application 118 invokes the application market infrastructure 106, such as by calling the infrastructure agent 106(b), to manage the actual purchase flow. The market infrastructure 106 has a transaction processing component 120 that manages the purchase workflow, starting from when the user indicates a decision to purchase the item and ending when the market infrastructure 106 informs the installed application 118 that the purchase has been successfully completed. The transaction processing component 120 also performs payment processing, using a payment method that has been previously specified by the user of the mobile device 102. Upon completion of the purchase transaction, the transaction processing component 120 notifies the application 118 that the item has been purchased and paid for. The application 118 then downloads, installs, and/or enables the purchased item.

The application market infrastructure may maintain billing accounts 122 for respective users. The billing account 122 for a particular user may specify a payment method for the user, such as credit card information of the user. When completing a purchase transaction, the transaction processing component 120 may authenticate the user and then automatically use the payment method specified by the billing account 122 to charge the user for in-app purchases.

Billing information specified by the billing account 122 of a user may be used for purchasing any of the applications 116 and for in-app purchases from within installed applications. Note that some of the applications 116 may be offered at no charge, but may nevertheless offer in-app purchasing opportunities.

The billing information specified by the billing account 122 of a user may also be used for in-app purchases of mobile data allocations. The mobile device 102 may be configured to consume data from a data allocation provided by the mobile data provider 104. The allocation may be for a fixed amount of data per billing period or may be for an amount that may be used over an arbitrary time period. More specifically, the data allocation associated with the mobile device 102 may be subscription-based or prepaid. In a subscription-based plan, the user pays a monthly amount and is given a monthly data allocation. In a prepaid plan, the user purchases a one-time data allocation, uses data from the allocation over any length of time, and then purchases an additional allocation.

The mobile data provider 104 may have a provisioning component 124 that supervises data allocations to the different mobile devices 102 serviced by the mobile data provider 104. A provider agent 126 monitors data consumption and determines remaining, unused amounts of the data allocation. The provider agent 126 may comprise a software component that runs on the mobile device 102 and that communicates with the mobile data provider 104 to determine the remaining data allocation available for use by the mobile device 102. A user of the mobile device 102 may be able to access this information to determine whether the current data allocation is nearly depleted. In addition, the installed application 118 may communicate with the provider agent 126 and/or with the mobile data provider 104 to detect a depletion of the current data allocation. Communications between the application 118 the provider agent 126 or mobile data provider 104 may be facilitated by the user of APIs exposed by the provider agent 126 and/or mobile data provider 104.

In some embodiments, the infrastructure agent 106(b) may expose APIs that are called by the application 118 to determine the remaining data allocation available to the mobile device 102. The infrastructure agent 106(b) may in turn be configured to obtain this information by querying or communicating with the mobile data provider 104 or the provider agent 126, using APIs exposed by the mobile data provider 104 or the provider agent 126.

Upon detecting depletion of the current data allocation for the mobile device 102, such as by determining that the unused portion of the data allocation is beneath a threshold, the installed application 118 may initiate an in-app purchase in order to increase the data allocation from the mobile data provider 104. For example, the application 118 may prompt the user of the mobile device 102 with options for purchasing different amounts of additional data. If the user responds affirmatively, the installed application 118 may communicate with the infrastructure agent 106(b) and/or the infrastructure service 106(a) to initiate an in-app purchase of the additional data. The market infrastructure 106 may complete the purchase of the additional data by displaying user dialogs on the mobile device 102, prompting the user for identification, transferring funds from the user to the mobile data provider 104, and so forth. Once the transaction has been completed, the market infrastructure 106 may notify the provisioning component 124 of the mobile data provider 104 of the purchase, and may instruct the mobile data provider 104 to provide or activate the newly purchased or newly increased allocation.

The mobile device 102 may also have a per-app usage monitor 128 that monitors data usage by each of multiple applications 118 that are installed on the mobile device 102. The per-app usage monitor 128 may be configurable by a user of the mobile device 102 to define a sub-allocation of the overall or aggregate mobile data application of the device 102, where the data sub-allocation is then associated with the application 118 and assigned for use by the installed application 118. In some cases, the per-app usage monitor 128 may enforce data usage rules, such as by preventing the installed application 118 from using data beyond its sub-allocation and/or by preventing applications from using sub-allocations of other applications.

The installed application 118 may be configured to communicate with the per-app usage monitor 128 to determine the remaining data sub-allocation of the installed application 118 and to detect depletion of the sub-allocation. For example, the application 118 may detect depletion of its sub-allocation by comparing the remaining unused amount of the sub-allocation to a depletion threshold. The sub-allocation is deemed to be depleted when the remaining unused amount of the sub-allocation is below the threshold.

Upon detecting a depletion of the sub-allocation associated with the installed application 118, the installed application 118 or another component of the mobile device 102 may initiate a purchase of an additional mobile device data allocation. For example, the application 118 may prompt the user of the mobile device 102 with options for purchasing different amounts of additional data. If the user responds affirmatively, the installed application 118 may communicate with the infrastructure agent 106(b) and/or the infrastructure service 106(a) to initiate an in-app purchase of the additional data. The market infrastructure 106 may complete the purchase of the additional data by displaying user dialogs on the mobile device 102, prompting the user for identification, transferring funds from the user to the mobile data provider 104, and so forth. Once the transaction has been completed, the market infrastructure 106 may notify the provisioning component 124 of the mobile data provider 104 of the purchase, and may instruct the mobile data provider 104 to provide or activate the newly purchased or newly increased allocation. In addition, the newly purchased allocation may be added to the sub-allocation of the installed application 118 by the per-app usage monitor 128.

The per-app usage monitor 128 may comprise a software component that runs as a background service on the mobile device 102. In some cases the per-app usage monitor 128 may comprise an application that is obtained from the infrastructure service 106(a) and installed on the mobile device 102. In some cases, some of the functionality of the per-app usage monitor 128 may be performed or supported by the market infrastructure 106.

Figure 2:
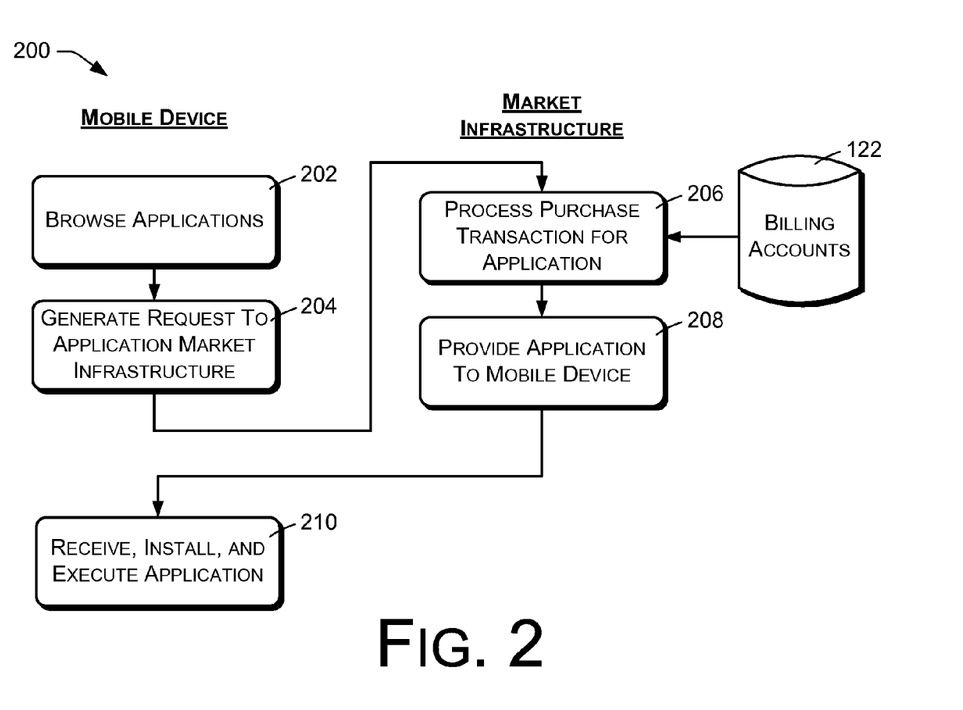
FIG. 2 illustrates a routine for providing applications to mobile devices from an application marketplace infrastructure.

FIG. 2 illustrates an example method 200 for selling and otherwise distributing applications from the application market infrastructure 106. The actions on the left side of FIG. 2 are performed by the mobile device 102. The actions on the right side of FIG. 2 are performed by the market infrastructure 106.

An action 202 comprises browsing the applications 116 that are available on the infrastructure service 106(a). The action 202 may be performed from the mobile device 102 using a dedicated application of the mobile device 102, such as an application created and provided by the market infrastructure 106. Alternatively, the action 202 may be performed using an Internet browser from the mobile device 102. In some situations, the action 202 may be performed using an Internet browser of a device other than the mobile device 102, such as a desktop computer or other computer. During the action 202, the market infrastructure 106 provides information relating to the various applications 116 that are available from the infrastructure service 106(a) and presents opportunities for the user to purchase or otherwise obtain any of the applications 116.

An action 204 comprises generating an application purchase request and providing the request to the application market infrastructure to provide one of the applications 116 that a user has selected during the browsing action 202. In the environment of FIG. 1, the request and any other communications between the mobile device 102 and the infrastructure service 106(a) are performed using the WAN 110.

In response to receiving the application purchase request, the infrastructure service 106(a) performs an action 206 of initiating and processing a purchase transaction based on the billing account information 122 associated with the user of the mobile device 102. The action 206 may comprise interacting with the user to obtain authorization for the purchase of the application and for obtaining payment information. In some cases, the payment information may be obtained from the previously configured billing account information 122. The action 406 may further comprising charging the user for the application using the payment method specified by the billing account 122 of the user. After completing the purchase transaction, an action 208 comprises providing the application to the mobile device 102. For example, the application may be provided as a download to the mobile device 102.

An action 210, performed by the mobile device 102, comprises receiving, installing, and executing the application.

Figure 3:
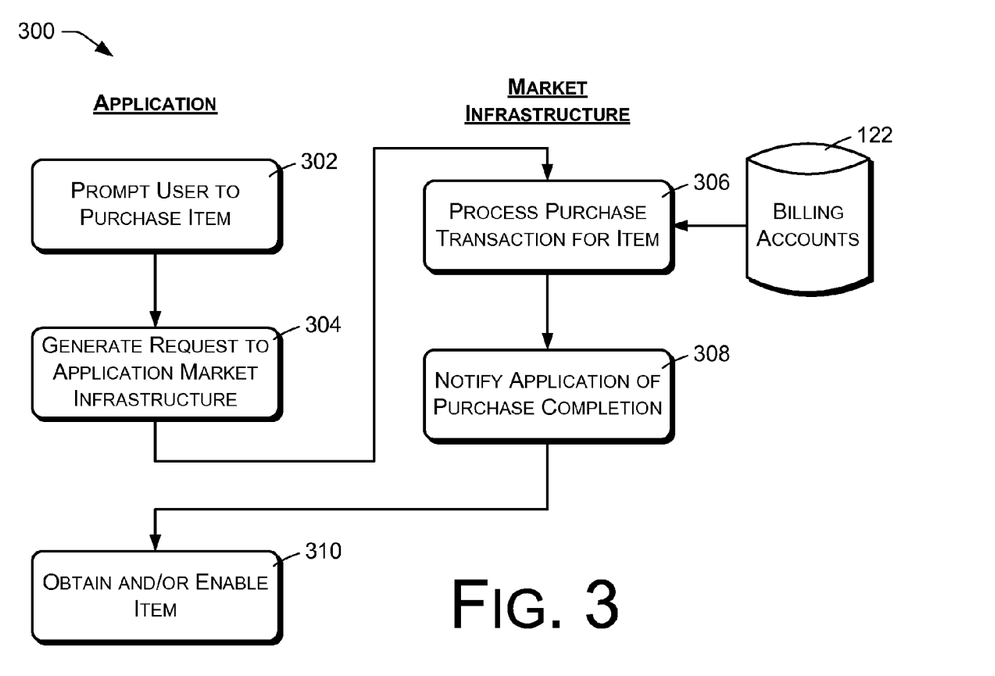
FIG. 3 illustrates a routine for purchasing items from within an application with the support of the application marketplace infrastructure.

FIG. 3 illustrates an example method 300 for implementing an in-app purchase, such as a purchase made from within the application obtained as a result of performing the method 200. The actions on the left side of FIG. 3 are performed by the installed application 118 as it executes on the mobile device 102. The actions on the right side of FIG. 3 are performed by the market infrastructure 106.

An action 302 comprises, from within the installed application 118, prompting the user of the mobile device to purchase an item. The item may comprise content or functionality of the installed application 118. In response to receiving an indication from the user to purchase the item, an action 304 is performed of generating an item purchase request and providing the item purchase request to the market infrastructure 106 to purchase the item. The item purchase request specifies the item that the user wants to purchase.

In response to receiving the item purchase request, the market infrastructure 106 performs an action 306 of processing a purchase transaction with the user of the mobile device 102. The action 306 may comprise interacting with the user to obtain authorization for the purchase of the application and for obtaining payment information. In some cases, the payment information may be obtained from the previously configured billing account information 122. After completing the purchase transaction, an action 308 comprises informing the installed application 118 that the purchase transaction has been successfully completed.

An action 310, performed by the application 118, comprises obtaining and/or enabling the purchased item. For example, this may comprise downloading content to be presented by the application 118. As another example, the action 310 may comprise enabling a feature or functionality of the application 118.

Figure 4:
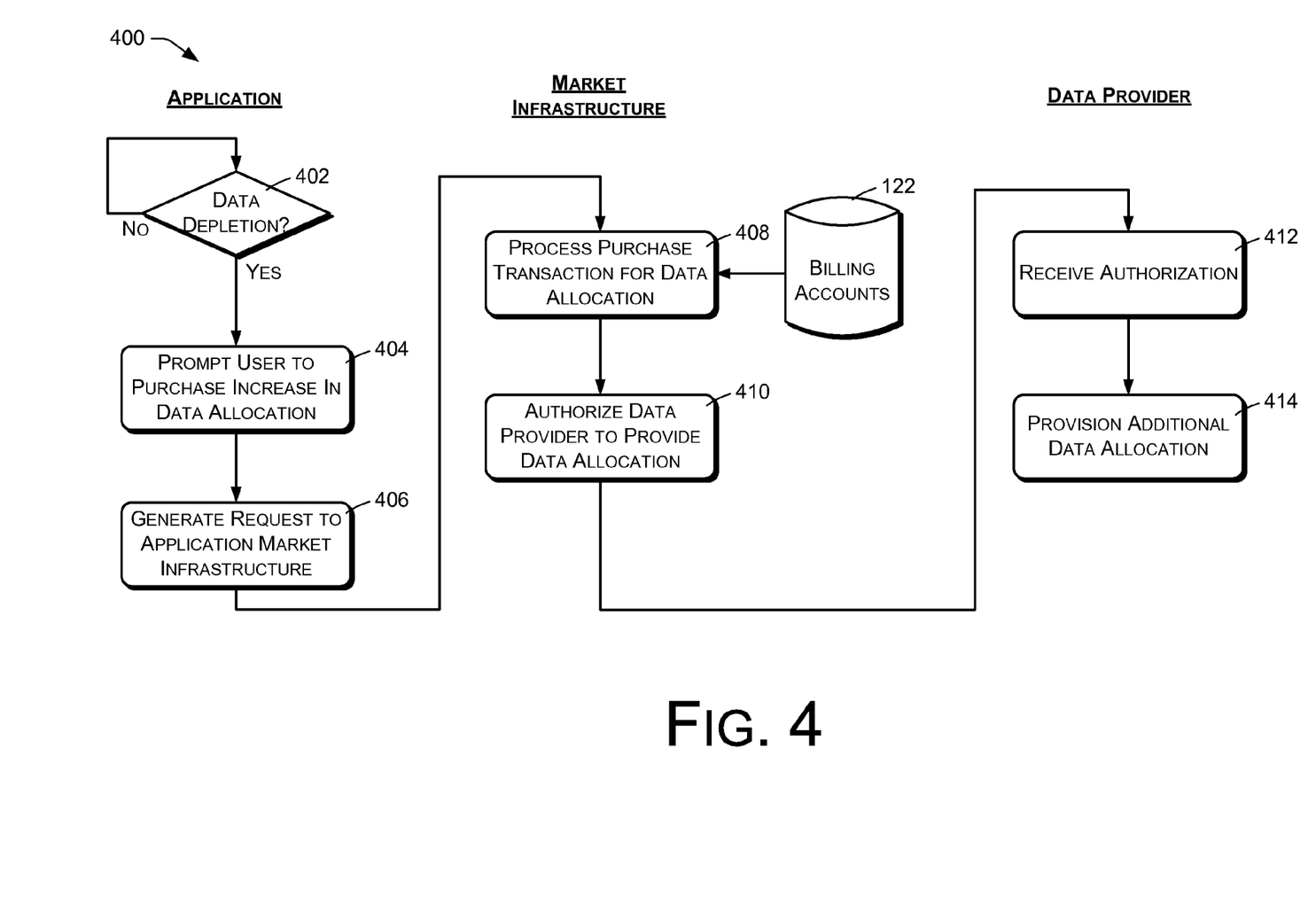
FIG. 4 illustrates a routine for purchasing mobile data allocations from within an application with the support of the application marketplace infrastructure.

FIG. 4 illustrates an example method 400 for implementing an in-app purchase of a data allocation, such from within the application 118 obtained as a result of performing the method 200. The actions on the left side of FIG. 4 are performed by the installed application 118 as it executes on the mobile device 102. The actions in the center of FIG. 4 are performed by one or more components of the application market infrastructure 106. The actions on the right side of FIG. 4 are performed by the mobile data provider 104.

An action 402 comprises detecting depletion of the current data allocation for the mobile device 102. This action may comprise communicating with a component of the mobile data provider 104, such as the provider agent 126 that executes on the mobile device 102, to determine the remaining available amount of the data allocation available for use by the mobile device 102. The action 402 may further comprise comparing the available amount to a threshold. If the remaining amount is above the threshold, the action 402 is repeated in a loop, or at periodic intervals, to monitor data allocation availability over time.

If the remaining amount is below the threshold, an action 404 is performed of prompting the user of the mobile device 102 to purchase an increase in the data allocation for the mobile device. The action 404 may comprise displaying a dialog from within the application. The dialog may present different purchase options, corresponding to different amounts of data. The dialog may also indicate the price of each option. The user may select one of the presented options to initiate a purchase process.

In response to receiving a selection by the user of a data allocation that they want to purchase, an action 406 is performed of generating a data purchase request and providing the data purchase request to the application market infrastructure 106 to initiate a purchase transaction for the selected increase in the data allocation. In some cases, the installed application 118 may communicate with the market infrastructure via the infrastructure agent 106(b), such as by calling an application programming interface (API) of the infrastructure agent. In the environment of FIG. 1, the infrastructure agent 106(b) may in turn communicate with the infrastructure service 106(a) using the WAN 110. The data purchase request may specify the purchase option that the user has selected, such as by specifying a product identifier or code corresponding to a data allocation package that is available from the mobile data provider 104.

In response to receiving the data purchase request, the market infrastructure 106 performs an action 408 of processing a purchase transaction with the user of the mobile device 102 for the increase in the data allocation. The action 408 may comprise interacting with the user to obtain authorization for the purchase of the application and for obtaining payment information. The action 408 may further comprising charging the user for the increase in the data allocation using the payment method specified by the billing account 122 of the user.

After completing the purchase transaction, an action 410 comprises notifying and authorizing the mobile data provider 104 to provide the purchased data allocation, and/or to increase the data allocation that is available to the mobile device 102.

An action 412, performed by, the mobile data provider 104, comprises receiving the authorization for the purchased data allocation. In response to receiving the authorization, the mobile data provider 104 performs an action 414 of provisioning or otherwise providing the purchased data allocation for use by the mobile device 102.

The action 408 may include performing financial accounting and reporting to account for the purchase of the data allocation. Payments to the mobile data provider 104 may be made on behalf of the market infrastructure 106 to compensate the mobile data provider 104 for the purchased data. The market infrastructure 106 may in some cases retain a certain amount of the purchase price as a commission.

The installed application 118 that initiates the in-app purchase for an increased data allocation may comprise any of various types of applications. As an example, the installed application 118 may comprise a game application that executes on the mobile device 102 to implement a game. A game such as this may consume data by transferring data with a game server. In some cases, a game may exchange real-time game data with a game server and/or with other devices who are participating in a common game. As another example, the installed application 118 may comprise a media player application that consumes data by receiving media data, such as audio and video, from an online media server or service. As another example, the installed application 118 may comprise a e-book reader that consumes data by receiving the text of books from an online server or service.

In some cases, a particular installed application 118 may be configured to initiate purchases for in-app items as well as for additional data allocations. For example, a game application may initiate in-app purchases for game capabilities or features. The same game application may also initiate a separate in-app purchase for an additional data allocation. Similarly, a media player application may initiate in-app purchase for content as well as for additional data allocations.

Figure 5:
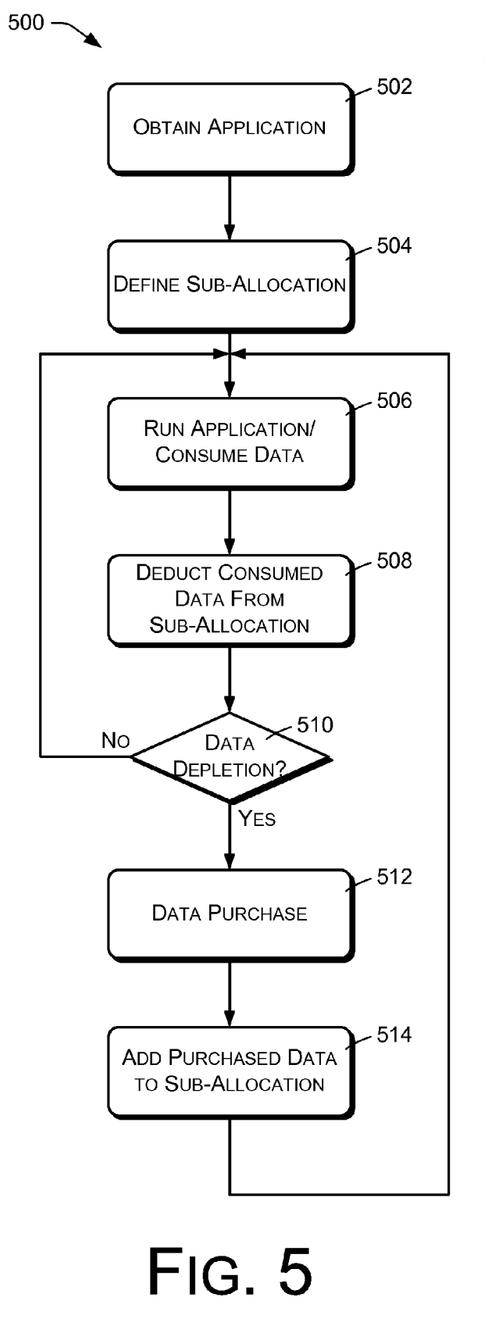
FIG. 5 illustrates a routine for monitoring data usage by an individual application and for purchasing additional data for allocation to the individual application.

FIG. 5 illustrates an example method 500 of allocating data of a mobile device for use by the installed application 118, for monitoring data usage by the application, and for purchasing additional data for the application. The method 500 may be performed by one or more components of a device that consumes data from a mobile data allocation, such by the mobile device 102 of FIG. 1.

An action 502 comprises obtaining the application 118 from the application market infrastructure 106. As an example, the application may be obtained in accordance with the method 200 of FIG. 2.

An action 504 comprises defining a sub-allocation of the mobile data allocation of the mobile device 102, for association with and use by the application 118 obtained in the action 502. As an example, the per-app usage monitor 128 of FIG. 1 may be configured to present a user interface that allows a user to define a data sub-allocation for each of multiple installed applications 118. In some cases, the sub-allocation may be specified as a maximum amount of data consumption, measured in units such as bytes. In other cases, the sub-allocation may be specified as a percentage of the aggregate mobile data allocation available to the device 102.

An action 506 comprises running the obtained application 118 on the mobile device 102, wherein the application consumes data from the mobile data allocation available to the mobile device 102.

An action 508 comprises deducting the amount of data consumed by the application 118 from the sub-allocation associated with the application 118. More specifically, as the application 118 consumes data the data is subtracted from the sub-allocation associated with the application 118.

An action 510 comprises detecting a depletion of the sub-allocation associated with the application 118. For example, the action 510 may comprise the application 118 communicating with the per-app usage monitor 128 to determine the remaining unused amount of the sub-allocation and comparing the amount to a depletion threshold. If the remaining amount is at least as great as the depletion threshold, the method 500 returns to the action 506, so that the application 118 continues to consume further data that is in turn deducted from the sub-allocation of the application 118.

If the remaining amount of unused data of the sub-allocation is less than the depletion threshold, an action 512 is performed of initiating a purchase of an increase in the mobile device data allocation of the device 102. The actions 510 and 512 may be performed in accordance with the method 400 of FIG. 4, as already described, where the action 402 is replaced by the action 510. In some cases the application 118 may prompt the user to purchase additional data, and in response to confirmation by the user may communicate with a component of the application market infrastructure 106 to request that the application market infrastructure 106 conduct a purchase transaction with the user for purchasing the increase in the device data allocation. In other cases the per-app usage monitor 128 may initiate a transaction for purchasing additional data by requesting that the application market infrastructure 106 conduct a purchase transaction with the user. In other cases, either the application 118 or the per-app usage monitor 128 may communicate directly with the mobile data provider 104 and/or with the provider agent 126 to initiate a purchase of the increase in the mobile device data allocation.

After completing a purchase transaction for an increase in the mobile data allocation of the device 102, an action 514 is performed of adding at least a portion of the increase to the sub-allocation associated with the application 118, for use by the application 118. In some cases, all or part of the additionally purchased data allocation may be added to the sub-allocation of the application 118 and reserved for exclusive use by the application 118, and other applications may be prohibited and prevented from using data from the sub-allocation.

Figure 6:
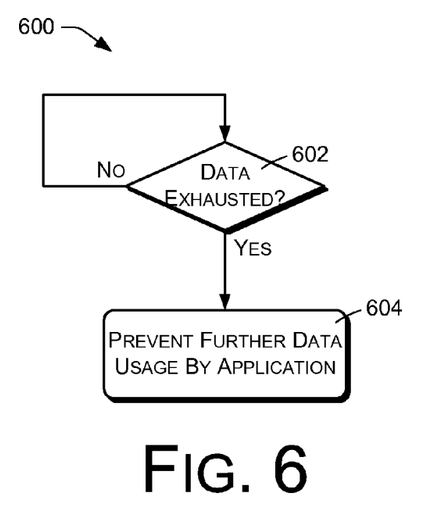
FIG. 6 illustrates a routine for monitoring data usage by an individual application and for preventing the application from using further data upon detecting that a data sub-allocation associated with the application has been exhausted.

FIG. 6 illustrates a further method 600 that may be used in conjunction with the method 500 to enforce data usage by the application 118 only from its associated sub-allocation. An action 602 comprises detecting whether the sub-allocation associated with the application 118 has been exhausted. If so, an action 604 is performed of preventing further data usage by the application 118. In one example, the application 118 may be configured to stop using data in response to detecting that the sub-allocation of the application 118 has been exhausted. In other embodiments, other software components of the mobile device 102, such as the communication components of the mobile device 102 and/or its operating system, may be configured to prevent usage of data by specific applications when such applications have exceeded their sub-allocations In addition, although not shown, the user may be prompted to purchase additional data for the sub-allocation associated with the application 118 as described above with reference to FIG. 4.

Figure 7:
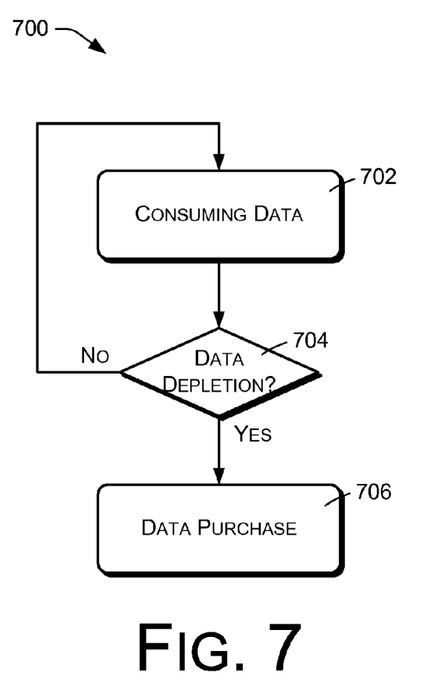
FIG. 7 illustrates a routine that may be performed by an application in order to monitor its data usage and to initiate a purchase transaction for an increased data allocation.

FIG. 7 illustrates an example method 700 that may be performed by the application 118 in some embodiments. An action 702 comprises consuming data from a sub-allocation of a device data allocation. As the data is consumed, it is deducted from the sub-allocation by the per-app usage monitor 128.

An action 704 comprises detecting depletion of the sub-allocation. The action 704 may be performed by communicating with the per-app usage monitor 128 and comparing the remaining, unused amount of the sub-allocation associated with the application 118 to a depletion threshold. If the remaining amount is at least as great as the depletion threshold, the method 700 returns to the action 702, so that the application 118 continues to consume further data that is in turn deducted from the sub-allocation of the application 118 by the per-app usage monitor. Otherwise, if the sub-allocation has become depleted, an action 706 is performed of initiating a purchase of an increase in the device data allocation. The action 706 may comprise an in-app purchase of additional data as described with reference to FIG. 4. As already described, all or a portion of the additionally purchased data is added to the sub-allocation of the application 118.

Figure 8:
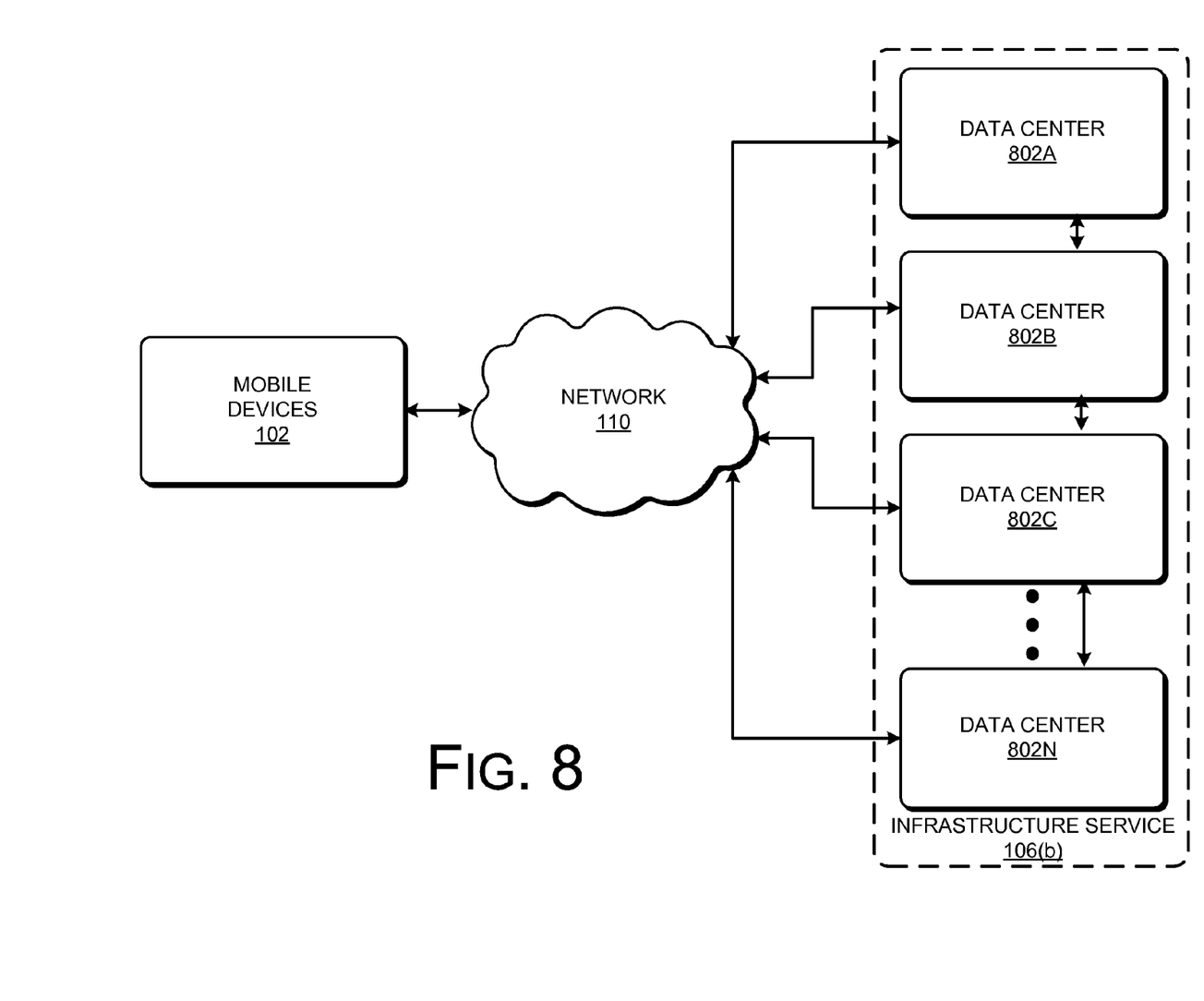
FIG. 8 is a system and network diagram that shows one illustrative operating environment for the embodiments disclosed herein that includes a service provider network.

FIG. 8 and the following description are intended to provide a brief, general description of a suitable computing environment in which the examples described herein may be implemented. In particular, FIG. 8 is a system and network diagram that shows an illustrative operating environment that includes the infrastructure service 106(*b*).

The computing resources provided by the infrastructure service 106 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by infrastructure service 106(*b*) are enabled in one implementation by one or more data centers 802A-802N (which may be referred to herein singularly as "a data center 802" or collectively as "the data centers 802"). The data centers 802 are facilities utilized to house and operate computer systems and associated components. The data centers 802 typically include redundant and backup power, communications, cooling and security systems. The data centers 802 might also be located in geographically disparate locations. One illustrative configuration for a data center 802 that implements some or all of the concepts and technologies disclosed herein will be described below with reference to FIG. 9.

The users and customers of infrastructure service 106 may access the computing resources provided by the data centers 802 over the WAN 110. Although the WAN 110 has been described as being at least partially implemented by wireless technologies, numerous other technologies may be used for communications between the mobile devices 102 and the infrastructure service 106(*b*), including wired technologies. It should also be appreciated that combinations of various interconnected networks may be utilized when communicating between the mobile devices 102 and the infrastructure service 106(*b*).

Figure 9:
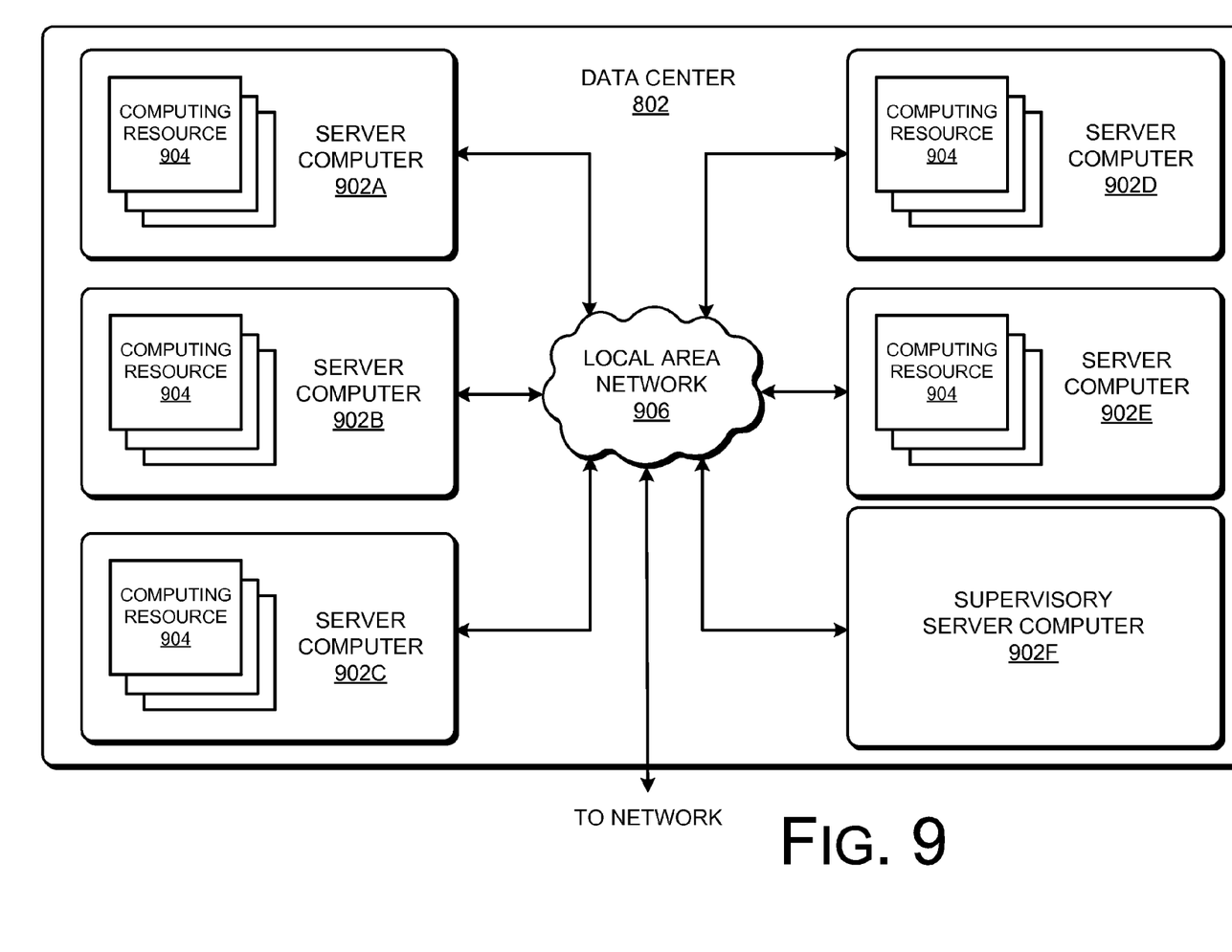
FIG. 9 is a computing system diagram that illustrates one configuration for a data center that implements aspects of a service provider network, including some or all of the concepts and technologies disclosed herein for implementing purchases of data allocations.

FIG. 9 is a computing system diagram that illustrates one configuration for a data center 802 that implements aspects of the infrastructure service 106(*b*), including some or all of the concepts and technologies disclosed herein in which the infrastructure service 106(*b*) performs purchase transactions for purchasing data allocations for a mobile device. The example data center 802 shown in FIG. 9 includes several server computers 902A-902F (which may be referred to herein singularly as "a server computer 902" or in the plural as "the server computers 902") for providing computing resources 904. The server computers 902 may be standard tower or rack-mount server computers configured appropriately for providing the computing resources described herein. According to an example, the server computers 902 are configured to implement the functionality of the infrastructure service 106(*b*) as described above.

In one example, some of the computing resources 904 are virtual machine instances. As known in the art, a virtual machine instance is an instance of a software implementation of a machine (i.e. a computer) that executes programs like a physical machine. Each of the server computers 902 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 902, for example.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 802 shown in FIG. 9 also includes a supervisory server computer 902F reserved for executing software components for managing the operation of the data center 802, the server computers 902, virtual machine instances, and other resources within the infrastructure service 106(*b*). In this regard, it should be appreciated that while these components are illustrated as executing within infrastructure service 106(*b*), computing systems that are external to infrastructure service 106(*b*) might also be utilized to execute some or all of these components.

In the example data center 802 shown in FIG. 9, an appropriate local area network ("LAN") 906 is utilized to interconnect the server computers 902A-902E and the supervisory server computer 902F. The LAN 906 is also connected to the WAN 110.

It should be appreciated that the configuration and network topology illustrated in FIGS. 5 and 6 have been greatly simplified and that many more computing systems, networks and networking devices may be utilized to interconnect the various computing systems disclosed herein. Appropriate load balancing devices or software modules might also be utilized for balancing a load between each of the data centers 802A-802N, between each of the server computers 902A-902F in each data center 802 and between virtual machine instances and other types of computing resources provided by the infrastructure service 106.

It should be appreciated that the data center 802 described in FIG. 9 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 10:
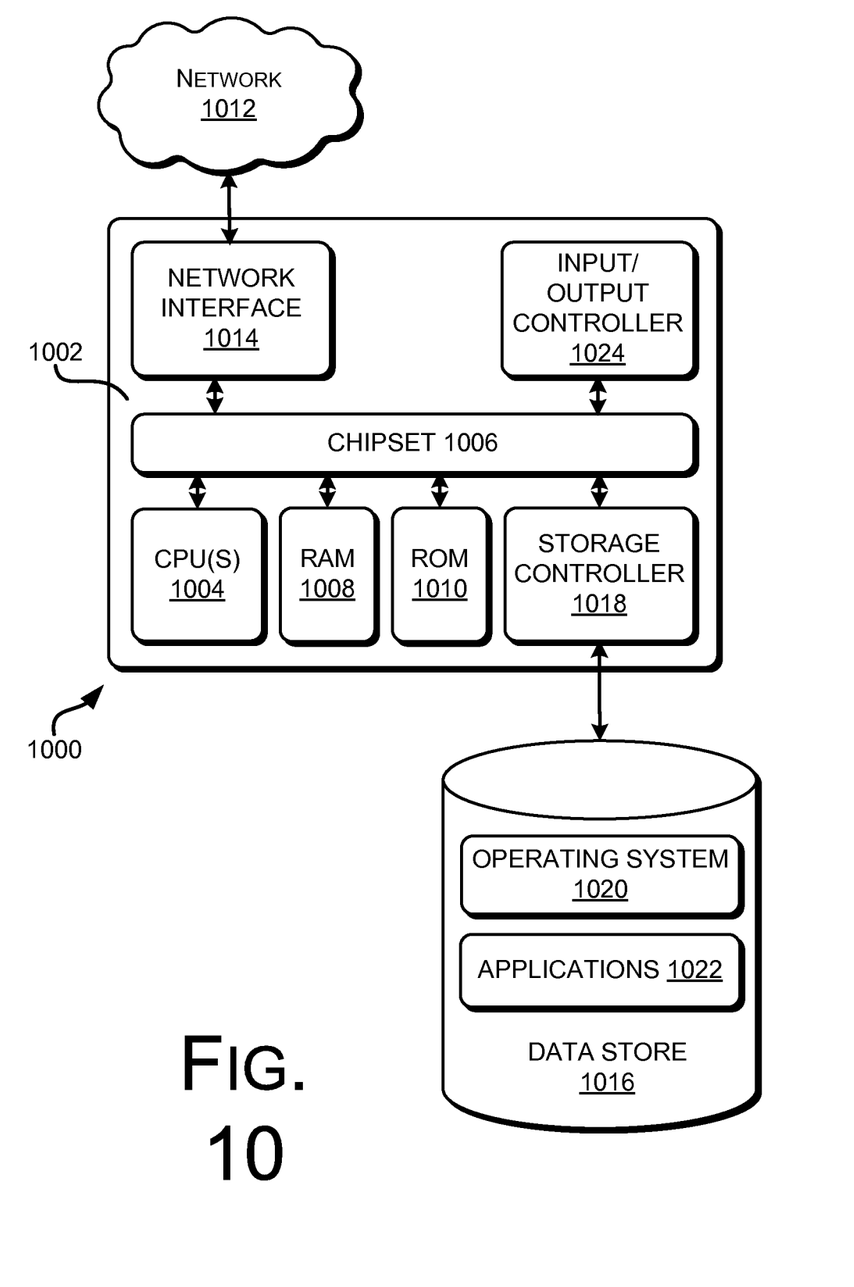
FIG. 10 is a computer architecture diagram showing one illustrative computer hardware architecture for implementing a computing device that might be utilized to implement aspects of the various embodiments presented herein.

FIG. 10 shows an example computer architecture for a computer 1000 capable of executing program components for implementing the techniques described above. Generally, the computer 1000 may comprise any of various types of devices, such as a conventional server computer, a workstation, a desktop computer, a laptop, a tablet, a network appliance, a personal digital assistant ("PDA"), a smartphone, an e-reader, or other computing device, and may be utilized to implement any of the functionality described herein. For example, the computer architecture shown in FIG. 10 may be utilized to implement the mobile device 102. As another example, the illustrated computer architecture may be utilized to implement each of the server computers 902.

The computer 1000 may include a baseboard 1002, or "motherboard," which is a printed circuit board to which a multitude of components or devices may be connected by way of a system bus or other electrical communication paths. In one illustrative example, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 1006 provides an interface between the CPUs 1004 and the remainder of the components and devices on the baseboard 1002. The chipset 1006 may provide an interface to a RAM 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the examples described herein.

The computer 1000 may operate in a networked environment using logical connections to remote computing devices and computer systems through a network, such as a network 1012. The chipset 1006 may include functionality for providing network connectivity through a network interface 1014, such as a gigabit Ethernet adapter, a WiFi® interface, and/or a cellular data interface. The network interface 1014 is capable of connecting the computer 1000 to other computing devices over the network 1012. It should be appreciated that multiple network interfaces may be present in the computer 1000, connecting the computer to various types of networks and remote computer systems.

The computer 1000 may be connected to a data store, such as a data store 1016, that provides non-volatile storage for the computer. The data store 1016 may store system programs, application programs, other program modules and data, which have been described in greater detail herein. The data store 1016 may be connected to the computer 1000 through a storage controller 1018 connected to the chipset 1006. The data store 1016 may consist of one or more physical storage units. The storage controller 1018 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the data store 1016 by transforming the physical state of the physical storage units to reflect the information being stored. The specific transformation of physical state may depend on various factors, in different implementations of this description. Examples of such factors may include, but are not limited to, the technology used to implement the physical storage units, whether the data store 1016 is characterized as primary or secondary storage and the like.

For example, the computer 1000 may store information to the data store 1016 by issuing instructions through the storage controller 1018 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the data store 1016 by detecting the physical states or characteristics of one or more particular locations within the physical storage units.

In addition to the data store 1016 described above, the computer 1000 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The data store 1016 may store an operating system 1020 utilized to control the operation of the computer 1000. According to one example, the operating system comprises the LINUX operating system. According to another example, the operating system comprises the WINDOWS® SERVER operating system from MICROSOFT Corporation. According to further examples, the operating system may comprise the UNIX operating system or the ANDROID mobile operating system. It should be appreciated that other operating systems may also be utilized. The data store 1016 may store other system or application programs and data utilized by the computer 1000, such as the software components and data described above with reference to the mobile device 102 and the infrastructure service 106.

The data store 1016 may also store one or more applications 1022 that are executable by the CPUs 1004 to perform the specialized functionality described above. For example, such applications may comprise the installed application 118, the infrastructure agent 106(*b*), the provider agent 126, the user interface 114, the transaction processing component 120, and so forth. The data store 1016 may also include repositories of the applications 116 as well as database representing the user billing accounts 122.

In one example, the data store 1016 or other computer-readable storage media is encoded with computer-executable instructions which, when loaded into the computer 1000, transform the computer from a general-purpose computing system into a special-purpose computer capable of implementing the examples described herein. These computer-executable instructions transform the computer 1000 by specifying how the CPUs 1004 transition between states, as described above. According to one example, the computer 1000 has access to computer-readable storage media storing computer-executable instructions which, when executed by the computer 1000, perform the various routines described above with regard to FIGS. 2-4. The computer 1000 might also include computer-readable storage media for performing any of the other computer-implemented operations described herein.

The computer 1000 may also include one or more input/output controllers 1024 for receiving and processing input from a number of input devices, such as a keyboard, a mouse, a touchpad, a touch screen, an electronic stylus, or other type of input device. Similarly, the input/output controller 1024 may provide output to a display, such as a computer monitor, a flat-panel display, a digital projector, a printer, a plotter, or other type of output device.

It will be appreciated that the computer 1000 may not include all of the components shown in FIG. 10, may include other components that are not explicitly shown in FIG. 10, or may utilize an architecture completely different than that shown in FIG. 10.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A method comprising:
obtaining an application from an application market infrastructure that provides applications for installation on mobile devices;
consuming data from a data allocation provided by a mobile data provider for the mobile device;
defining a sub-allocation of the data allocation for use by the application, whereby the application is prevented from consuming additional data when the sub-allocation has been exhausted;
running the application on the mobile device, wherein the application consumes data;
deducting an amount of the data consumed by the application from the sub-allocation of the data allocation;
detecting depletion of the sub-allocation;
prompting a user of the mobile device to purchase an increase in the data allocation for use by the application;
communicating with a component of the application market infrastructure to request that the application market infrastructure conduct a purchase transaction with the user for purchasing the increase in the data allocation; and
adding at least a portion of the increase in the data allocation to the sub-allocation for use by the application.

2. The method of claim 1, wherein the sub-allocation is specified as a percentage of the data allocation provided by the mobile data provider.

3. The method of claim 1, further comprising reserving the sub-allocation for exclusive use by the application.

4. The method of claim 1, wherein prompting the user of the mobile device to purchase the increase in the data allocation is performed by the application.

5. The method of claim 1, further comprising:
prompting the user to purchase content or functionality that are accessible by the application; and
communicating with the component of the application market infrastructure to request that the application market infrastructure conduct a second purchase transaction with the user for purchasing the content or functionality.

6. The method of claim 1, wherein detecting depletion of the sub-allocation comprises determining that an unused portion of the sub-allocation is below a threshold.

7. The method of claim 1, wherein detecting depletion of the sub-allocation is performed by the application.

8. A method performed by a device that consumes data from a data allocation, the method comprising:
defining a sub-allocation of the data allocation for use by an application that runs on the device, whereby the application is prevented from consuming additional data when the sub-allocation has been exhausted;
deducting an amount of data consumed by the application from the sub-allocation of the data allocation;
detecting depletion of the sub-allocation;
initiating a transaction with a user of the device to obtain an increase in the data allocation by communicating with a component of an application market infrastructure to request that the application market infrastructure conduct a first purchase transaction with the user to purchase the increase in the data allocation;
adding at least a portion of the increase in the data allocation to the sub-allocation for use by the application; and
communicating with the component of the application market infrastructure to request that the application market infrastructure conduct a second purchase transaction with the user to purchase content or functionality that is accessible by the application.

9. The method of claim 8, wherein the sub-allocation is specified as a percentage of the data allocation.

10. The method of claim 8, further comprising reserving the sub-allocation for exclusive use by the application.

11. The method of claim 8, wherein detecting depletion of the sub-allocation comprises determining that an unused portion of the sub-allocation is below a threshold.

12. The method of claim 8, wherein initiating the transaction is performed by the application and the transaction is conducted independently of the application.

13. The method of claim 6, wherein detecting depletion of the sub-allocation is performed by the application.

14. One or more non-transitory computer-readable media storing an application, the application being configured for execution by one or more processors of a device to perform actions comprising:

consuming data from a sub-allocation of a data allocation, whereby the application is prevented from consuming additional data when the sub-allocation has been exhausted;

detecting depletion of the sub-allocation; and initiating a purchase of an increase in the data allocation by communicating with a component of an application market infrastructure to request that the application market infrastructure conduct a purchase transaction with the user to purchase the increase in the data allocation, wherein the application market infrastructure completes the purchase transaction independently of the application, and wherein at least a portion of the increase in the data allocation is added to the sub-allocation for use by the application.

15. The one or more computer-readable media of claim 14 wherein said at least a portion of the increase in the data allocation is added to the sub-allocation for exclusive use by the application.

16. The one or more computer-readable media of claim 14, the actions further comprising prompting the user to purchase the increase in the data allocation in response to detecting the depletion of the sub-allocation.

17. The one or more computer-readable media of claim 16, wherein detecting depletion of the sub-allocation comprises determining that an unused portion of the sub-allocation is below a threshold.

18. The one or more computer-readable media of claim 16, the actions further comprising:

detecting exhaustion of the sub-allocation;

limiting further consumption of data in response to detecting exhaustion of the sub-allocation.

19. The one or more computer-readable media of claim 14, the actions further comprising:

prompting the user to purchase content or functionality that are accessible by the application; and communicating with the component of the application market infrastructure to request that the application market infrastructure conduct a second purchase transaction with the user to purchase the content or functionality.

20. The one or more computer-readable media of claim 14, wherein the sub-allocation is specified as a percentage of the data allocation.

* * * * *